United States Patent
Graham et al.

(10) Patent No.: US 9,220,188 B2
(45) Date of Patent: Dec. 29, 2015

(54) INDIVIDUALLY ARTICULATING AUTOMATIC TRANSPORT LOCKS FOR FOLDING IMPLEMENTS

(71) Applicant: Forage Innovations B.V., PA Maassluis (NL)

(72) Inventors: Lucas B. Graham, New Sharon, IA (US); David W. Jahraus, Pella, IA (US); Tyler G. Schiferl, Pella, IA (US); Michael Kindley, Oskaloosa, IA (US)

(73) Assignee: FORAGE INNOVATIONS B.V., PA Maassluis (NL)

( * ) Notice: Subject to any disclaimer, the term of this patent is extended or adjusted under 35 U.S.C. 154(b) by 211 days.

(21) Appl. No.: 13/970,216

(22) Filed: Aug. 19, 2013

(65) Prior Publication Data

US 2015/0047312 A1 Feb. 19, 2015

(51) Int. Cl.
*A01B 49/00* (2006.01)
*A01B 73/06* (2006.01)
*A01D 78/14* (2006.01)

(52) U.S. Cl.
CPC ............ *A01B 73/065* (2013.01); *A01D 78/146* (2013.01)

(58) Field of Classification Search
CPC .... A01B 9/006; A01B 73/044; A01B 73/046; A01B 73/04; B60D 1/04; B60D 1/28; B60D 1/06; A01D 78/1014
USPC ................. 172/311, 776, 275, 481, 446, 683; 280/509, 504, 456.1, 477, 515, 510; 37/231; 56/228, 396; D12/162
See application file for complete search history.

(56) References Cited

U.S. PATENT DOCUMENTS

| | | | | |
|---|---|---|---|---|
| 2,597,096 A | * | 5/1952 | Harris | 280/509 |
| 2,869,654 A | * | 1/1959 | Hershman | 172/272 |
| 3,814,191 A | | 6/1974 | Tilbury | |
| 3,944,001 A | * | 3/1976 | Warner et al. | 172/311 |
| 4,135,731 A | * | 1/1979 | Lorenz et al. | 172/439 |
| 4,146,246 A | * | 3/1979 | Geisthoff | 172/275 |
| 4,204,575 A | * | 5/1980 | Richardson et al. | 172/1 |
| 4,316,511 A | * | 2/1982 | Andersen | 172/776 |
| 4,535,848 A | * | 8/1985 | Pfenninger et al. | 172/311 |
| 4,561,505 A | * | 12/1985 | Williamson | 172/776 |
| 4,660,654 A | * | 4/1987 | Wiebe et al. | 172/776 |
| 4,867,245 A | * | 9/1989 | Stevens | 172/311 |
| 4,890,972 A | * | 1/1990 | Nekola et al. | 414/563 |
| 5,031,927 A | * | 7/1991 | Frenette | 280/481 |
| 5,155,986 A | | 10/1992 | Kelderman | |
| 5,244,047 A | * | 9/1993 | Eudy | 172/275 |
| D351,604 S | * | 10/1994 | Eudy | D15/28 |
| 5,493,853 A | | 2/1996 | Tonutti | |
| 5,713,691 A | | 2/1998 | Solberg | |
| 5,724,798 A | * | 3/1998 | Stefl et al. | 56/119 |

(Continued)

FOREIGN PATENT DOCUMENTS

EP 503396 A1 * 9/1992 ............ A01B 63/00

*Primary Examiner* — Arpád Fábián-Kovács
(74) *Attorney, Agent, or Firm* — Sturm & Fix LLP

(57) ABSTRACT

A latch to secure folding implements in a transport configuration. The latch is constructed so as to permit selective disengaging of the latch to allow the folding implement to be configured for operation. A latching mechanism with a pivoting portion engages a crossbar in latching. One of the latching mechanism or pivoting portion is suspended on an extension bar which is cantilevered and suspended from either a main frame or a folding arm. The latching system tolerates misalignment of the main frame and folding arms through the suspension system.

20 Claims, 10 Drawing Sheets

(56) References Cited

U.S. PATENT DOCUMENTS

| | | | |
|---|---|---|---|
| 5,740,870 A * | 4/1998 | Rodgers et al. | 172/456 |
| 6,203,236 B1 * | 3/2001 | Gautier et al. | 403/322.1 |
| 6,336,511 B1 | 1/2002 | Friggstad | |
| 6,691,794 B2 * | 2/2004 | Paluch et al. | 172/679 |
| 6,851,698 B2 * | 2/2005 | Ingles | 280/509 |
| 7,100,350 B2 * | 9/2006 | Breneur | 56/365 |
| 7,313,905 B2 | 1/2008 | Vaske | |
| 7,438,137 B2 * | 10/2008 | Pederson et al. | 172/311 |
| 7,690,439 B2 * | 4/2010 | Priepke et al. | 172/47 |
| 7,712,297 B1 | 5/2010 | Giovannini | |
| 7,849,933 B2 | 12/2010 | Marggi | |
| 7,967,321 B2 * | 6/2011 | Wulff | 280/456.1 |
| 8,191,914 B2 * | 6/2012 | Wulff | 280/456.1 |

* cited by examiner

INDIVIDUALLY ARTICULATING AUTOMATIC TRANSPORT LOCKS FOR FOLDING IMPLEMENTS

BACKGROUND OF THE INVENTION

1. Field of the Invention

The present invention relates generally to folding implements such as those used in field work in agricultural, for instance, wheel rakes. More particularly, the present invention relates to an improved locking system to secure the implement in a folded position for transport.

2. Background Art

Many implements today require folding to narrow their width for transport through gates and on public roadways. An example of such a folding implement is disclosed in U.S. Pat. No. 7,313,905 by Vaske et al., which is hereby incorporated in its entirety by reference.

Present-day transport locks require an operator to exit the towing vehicle to manually engage the locks before transport. Frequently, operators fail to utilize manual locks prior to transport as it requires the operator to get out of or off the towing implement to install. Operators may fail to recognize the value of the transport lock over their time and effort, especially during busy seasons.

Some present-day towed implements include automatic transport lock mechanisms to lock the implement in the folded position. Due to strains induced to the implement by its resting on uneven ground, the present-day transport locks may fail to align. Hence, these existing automatic locks require the implement to be on level ground in order to properly align the folding arms and main frame for folding. In addition, the automatic locks fix the folded arms of the implement more or less rigidly to the main frame of the implement, thus inducing stresses in the implement as it is transported over uneven terrain. Such stresses can cause strains in the plastic region (resulting in permanent distortion), breakage, or fatigue.

There is, therefore, a need for a system to automatically lock folding components of an implement to eliminate exiting the towing vehicle and, thus, encourage use of the transport locks for implement transport. There is an additional need for a transport locking system that permits independent movement of the folding arms while in the locked, transport configuration.

SUMMARY OF THE INVENTION

An object of the present invention is to provide a locking method and apparatus to secure a folding implement in a transport configuration.

Another object of this invention is to configure the transport locking system so an operator is not required to exit the towing vehicle, such as a farm tractor, to engage the lock.

An additional object of this invention is to configure the transport locking system to allow for independent movement between the folding arms and the main frame of the folding implement.

An automatic transport lock is suspended from the implement—either the main frame or the folding arms—during normal use. The transport lock is suspended in such a way as to include variable vertical displacement to compensate for any height adjustment needed over time from normal wear, and when the implement is disposed on uneven ground. When the implement is folded for transport, the arms engage the transport lock as a matter of course, the hydraulic cylinders used for folding the arms supplying all the work required to engage the locking mechanism to secure the folding arms for transport. After the implement is folded and the arms are locked for transport, the previously mentioned suspension system of the locks allows for articulation of the folding arms relative to the main frame, as well as allowing for articulation of the folding arms relative to each other. A pull rope is preferably utilized to unlock the mechanism from the tractor seat before opening the implement.

Other objects, advantages and novel features of the present invention will become apparent from the following detailed description of the invention when considered in conjunction with the accompanying drawings.

DETAILED DESCRIPTION OF THE INVENTION

Figure 1:
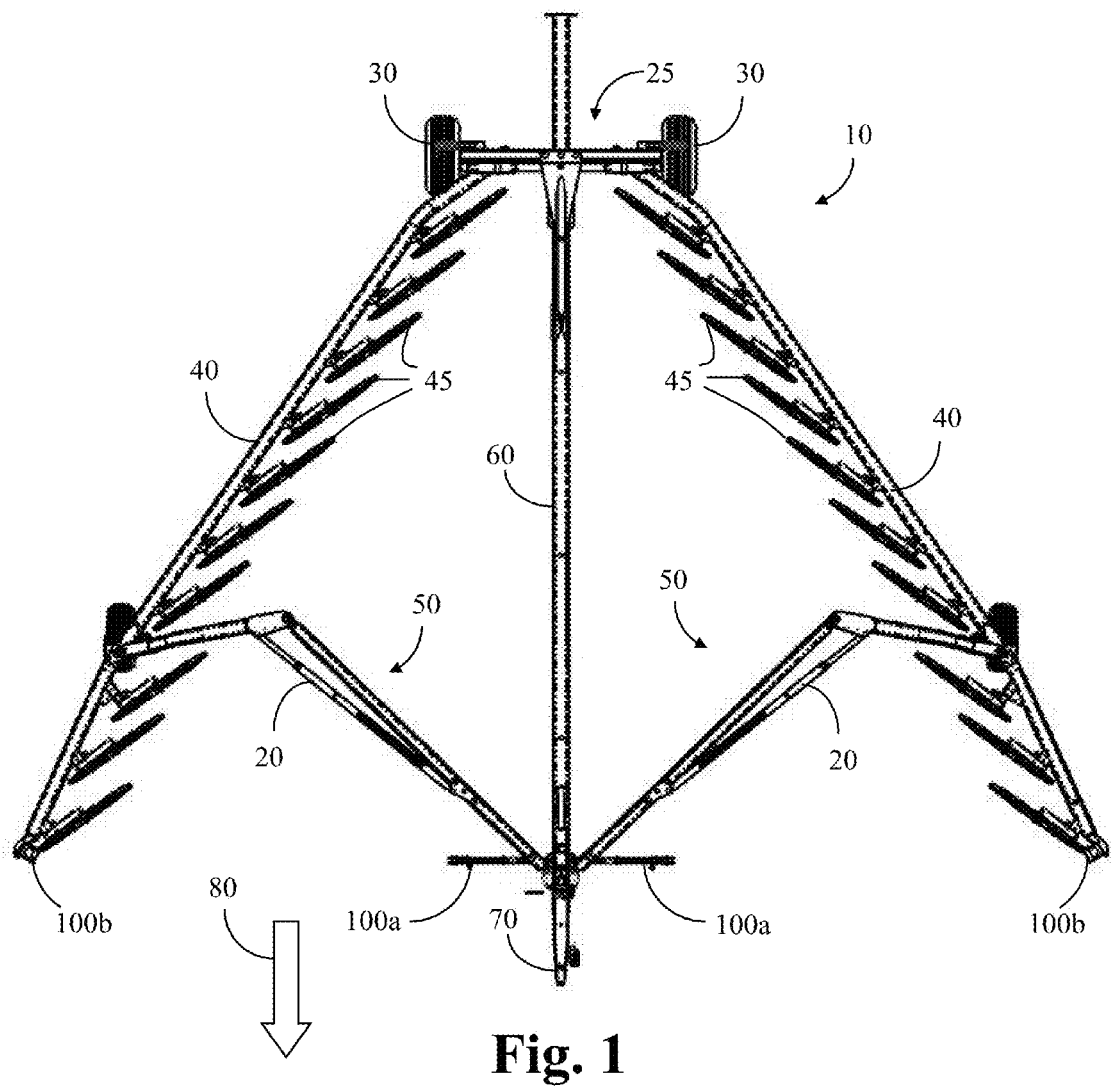
FIG. 1 is a top plan view of a towed agricultural rake in a nearly unfolded configuration with transport locks disengaged.

Referring now to the drawings wherein like reference numerals correspond to the same or similar parts throughout the drawings, the present invention includes a system for locking folding arms of a folding implement to the implement's main frame for purposes of transport. When a specific implement is shown (FIGS. 1 and 2) or mentioned, an agricultural wheel rake is specified. However, it should be clearly understood, this invention is not limited to wheel rakes. Other folding implements such as planters, rippers, disks, sprayers, etc., may also make use of this invention to advantage.

Figure 2:
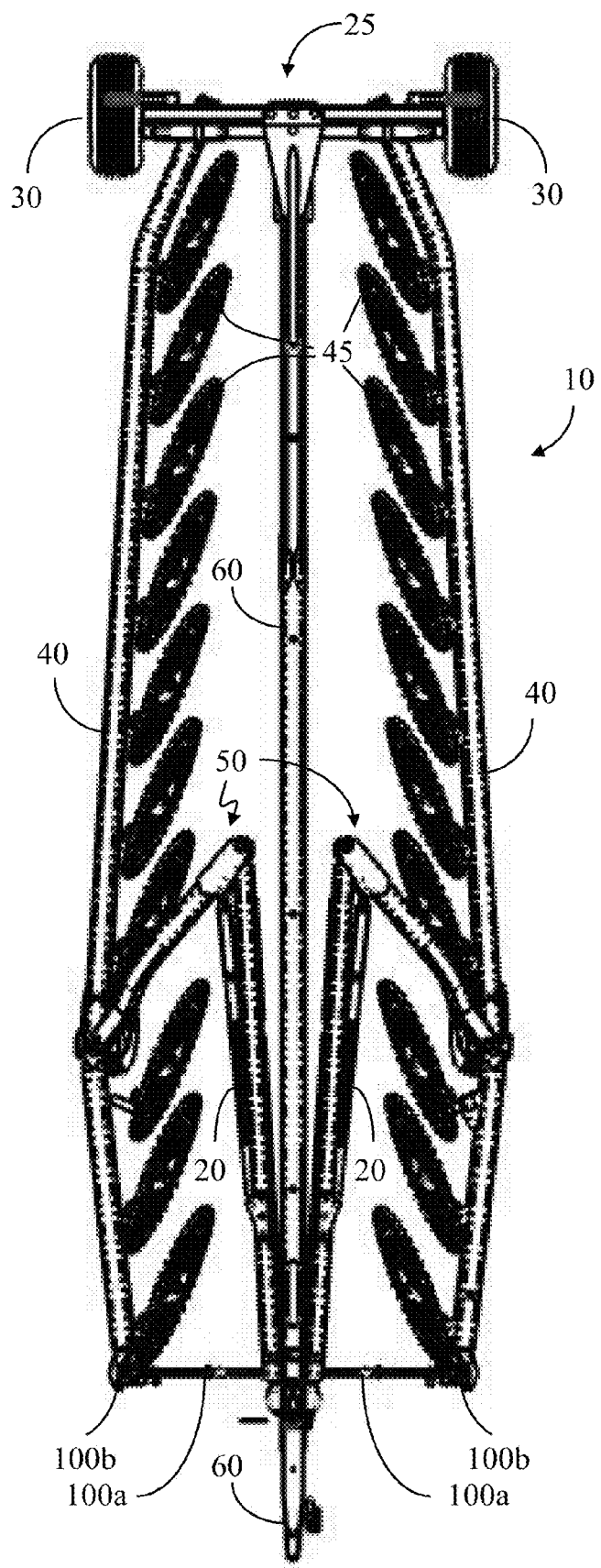
FIG. 2 is a top plan view of a towed agricultural rake in a folded, transport configuration with the transport locks engaged in their transport mode.

In FIG. 1, a wheel rake 10 is shown in a substantially unfolded or open configuration. In FIG. 2, the wheel rake 10 is shown in its folded, narrow, transport configuration. Narrowing and widening are carried out using hydraulic cylinders 20, as is well known by those of ordinary skill in the art. The hydraulic pressure and flow are provided by the prime mover, such as an agricultural tractor (not shown).

The folding implement preferably comprises a cart 25, the cart 25 comprising ground engaging wheels 30 to provide support for the wheel rake 10—though some folding implements do not require such support, and this invention is not limited to folding implements requiring ground engaging wheels 30 or the like for support—a main frame or towing bar 60, and a tongue 70, to which the implement 10 is hitched to a prime mover (not shown), such as an agricultural tractor.

For the purposes of this document, including the claims, a towable implement is hereby defined as an implement having at least one ground engaging wheel, skid, track, etc., independent of that of the prime mover by which the towable implement is towed. A towed implement is removably attached to the prime mover (e.g., via any known hitch) and is not permanently mounted thereto and is not entirely supported thereby.

The folding implement 10 further comprises folding arms 40 and folding linkages 50 by which the folding arms 40 are folded relative to the towing bar 60 for operation or transport. The folding arms 40 are operatively, pivotally affixed to the cart 25 and provide mounting for at least one implement unit, such as a rake wheel 45, as shown in FIGS. 1 and 2, planter unit, sprayer nozzle, or tillage mechanism, etc.

The implement is towed by the prime mover, commonly an agricultural tractor. For the purposes of this document, including the claims, the following terms are formally defined: a forward direction 70 is defined as the usual direction of operation, and is indicated in FIG. 1 by an arrow pointing in the forward direction 80. The front of the implement 10 is defined as the end of the implement 10 toward the forward direction 80. Likewise, the rearward direction is herein defined as the opposite direction as the forward direction 80. The rear of the implement 10 is defined as the end of the implement 10 toward the rearward direction. Hence, the tongue 70 is disposed at the front of the implement 10, while the wheels 30 are shown in FIGS. 1 and 2 to be disposed at or near the rear of the implement 10. The verb, narrow, is hereby defined as reducing the implement's 10 width in a direction perpendicular to the forward direction 70. Folding inward is defined as synonymous with narrowing. The verb, widen, is hereby defined as increasing the implement's 10 width in a direction perpendicular to the forward direction 70. Folding outward is defined as synonymous with widening.

Transport locking mechanism assemblies 100a, 100b are shown toward the front of the implement 10, one set of assemblies 100a, 100b for each of the two folding arms 40. The towing bar latch assembly 100a being operatively affixed to the towing bar 60, while the folding arm latch assembly 100b is operatively affixed to a free arm end of the folding arms 40.

Figure 3:
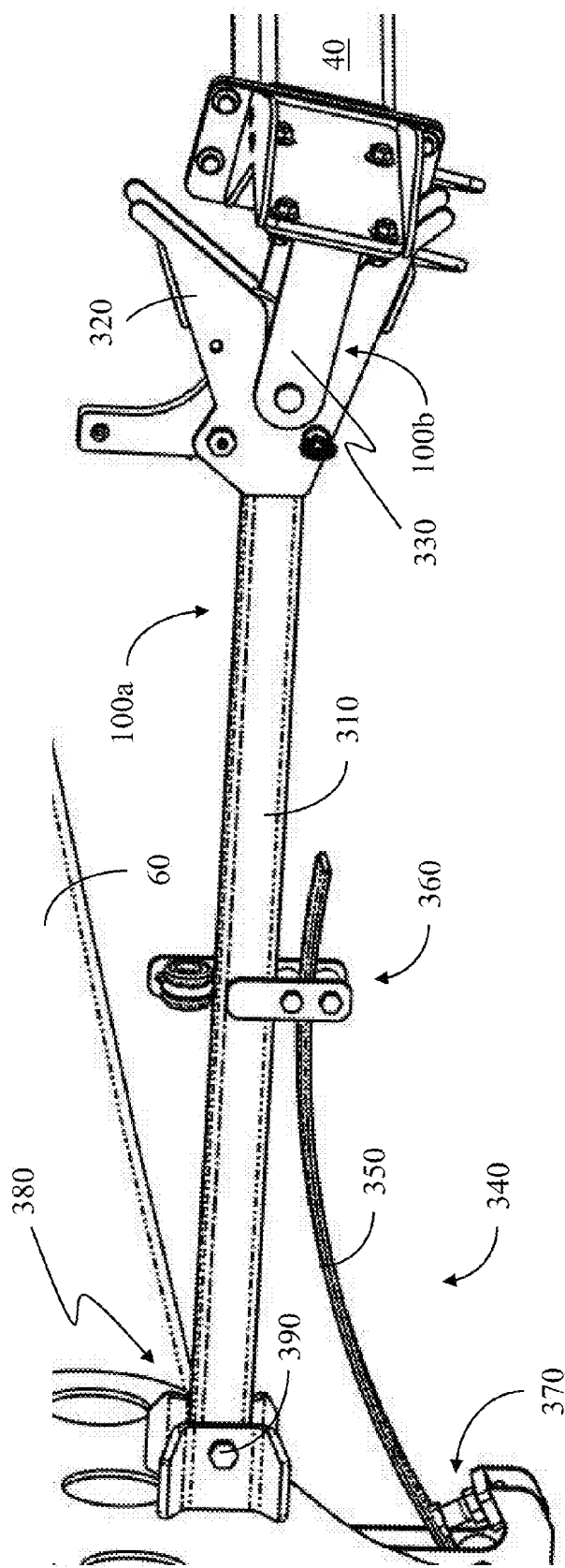
FIG. 3 is a perspective view, generally from the front of the implement, of the transport lock with its suspension system and in its engaged configuration.

More details of one set of transport locking mechanism assemblies 100a, 100b are illustrated in FIG. 3. An extension arm 310 may be required for some folding implements 10 to provide spacing between the main frame 60 of the cart 25 and the folding arm 40. A latch mechanism 320 and crossbar assembly 330 work together to form the transport locking mechanism assembly set 100a, 100b. The crossbar assembly, as shown in FIG. 3, may be operatively affixed to one of the folding arms 40 at the free end.

In order to effect the alignment of the latch mechanism 320 and crossbar assembly 330, the latch mechanism 320 includes a suspension system 340 comprising, in a preferred embodiment, a leaf spring 350, a shackle 360, and an anchor 370. Other valid embodiments include the use of tension, compression, or torsion springs. The present invention is not limited to a particular suspension system 340.

The suspension system 340 is used to support the extension arm 310, which is operatively, pivotally affixed to the main frame 60 by a hinged joint 380. The extension arm 310 is free to pivot about the pin 390. Support to keep the extension arm 310 from falling to its position of lowest potential energy due to gravity is provided by the suspension system 340.

The vertical articulation of the extension arm 310 due to pivoting about the pin 390, the suspension system 340, and the V-shape of the latch mechanism 320 work together to allow alignment of the separate parts of the transport locking mechanism assemblies 100a, 100b, especially under conditions of strain caused by the implement 10 sitting on uneven surfaces, or of normal wear and the effects of age and use.

Clearly, as those of ordinary skill in the art are well aware, the components of the transport locking mechanism assembly 100a, 100b may be reversed. In other words, the crossbar assembly 330 may be operatively affixed to the extension arm 310, which may, in turn, be affixed to either the main frame 60 or one of the folding arms 40. Similarly, the latch mechanism 320 may not be affixed to the extension arm 310, but more or less directly to either the main frame 60 of the cart 25 or one of the folding arms 40. In some applications, no extension arm 310 will be required. The present invention is not intended to be limited to the exact order shown in FIG. 3.

Figure 4:
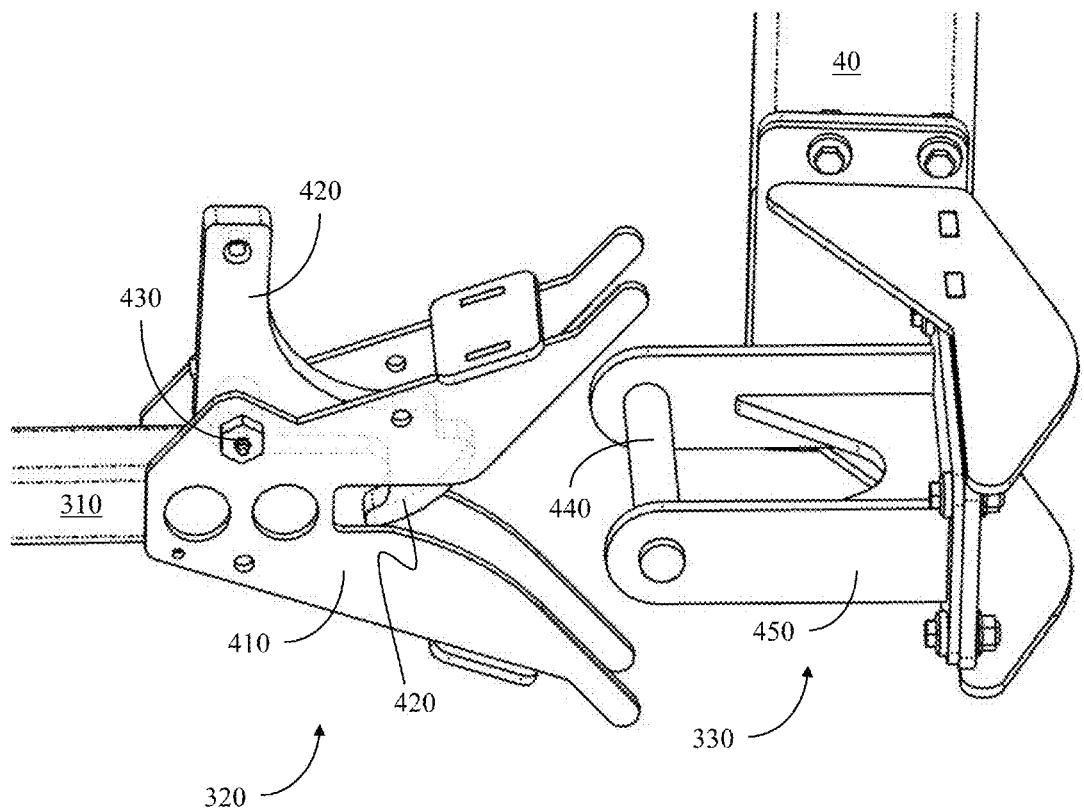
FIG. 4 is a perspective view, generally from the front of the implement, of the transport lock in its disengaged configuration.

Details of the latch mechanism 320 and crossbar assembly 330 are illustrated in FIG. 4. A stationary portion 410 of the latch mechanism 320 is affixed to the extension arm 310, if any. A latch element or pivoting portion 420 of the latch mechanism 320 is operatively, rotatably attached to the stationary portion 410 at a pin or bolt 430. The latch element 420 of the latch mechanism 320 is free to pivot to allow a crossbar 440 to enter the latch mechanism 320, then return to capture the crossbar 440 to secure the transport locking mechanism assemblies 100a, 100b. The pivoting portion 420 of the latch mechanism 320 is biased by a spring (not shown) to hold it in its closed position to avoid accidental opening and the consequential release of the crossbar 440. The crossbar 440 is operatively affixed to the folding arm 40 via a support structure 450, which may take on many forms.

Figure 5:
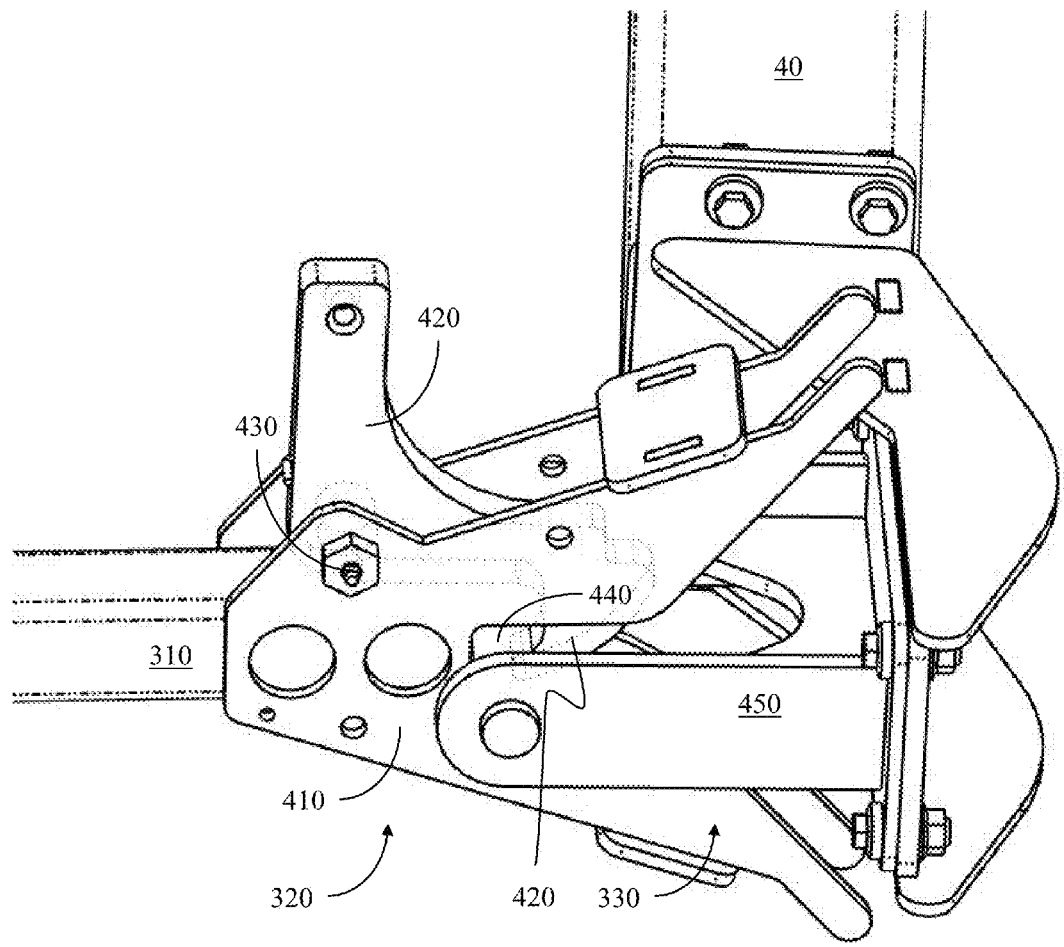
FIG. 5 is a perspective view, generally from the front of the implement, of the transport lock in its engaged configuration.

The latch mechanism 320 and crossbar assembly 330 are shown in the latched configuration in FIG. 5. The crossbar 440 is captured between the stationary portion 410 of the latch mechanism 320 and the latch element 420 of the latch mechanism 320. In this configuration, the pivoting portion 420 is held in place by a biasing mechanism, such as a spring (not shown).

Figure 6:
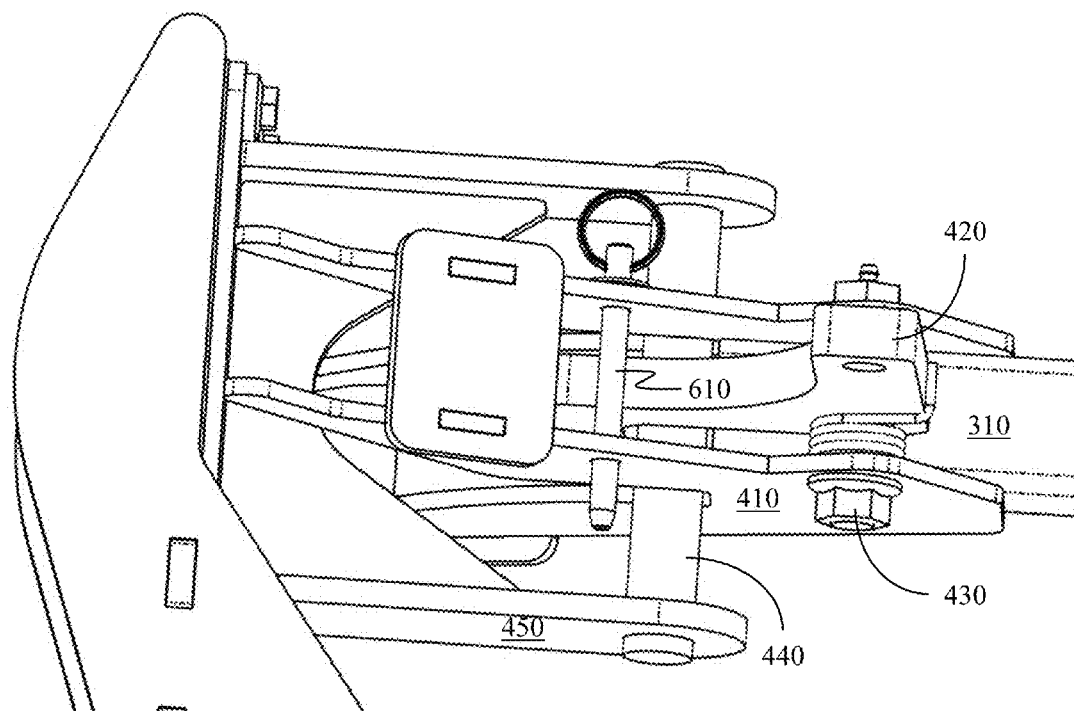
FIG. 6 is a perspective view, generally from the top, of the transport lock in its engaged configuration, and with a securing pin.
Figure 7:
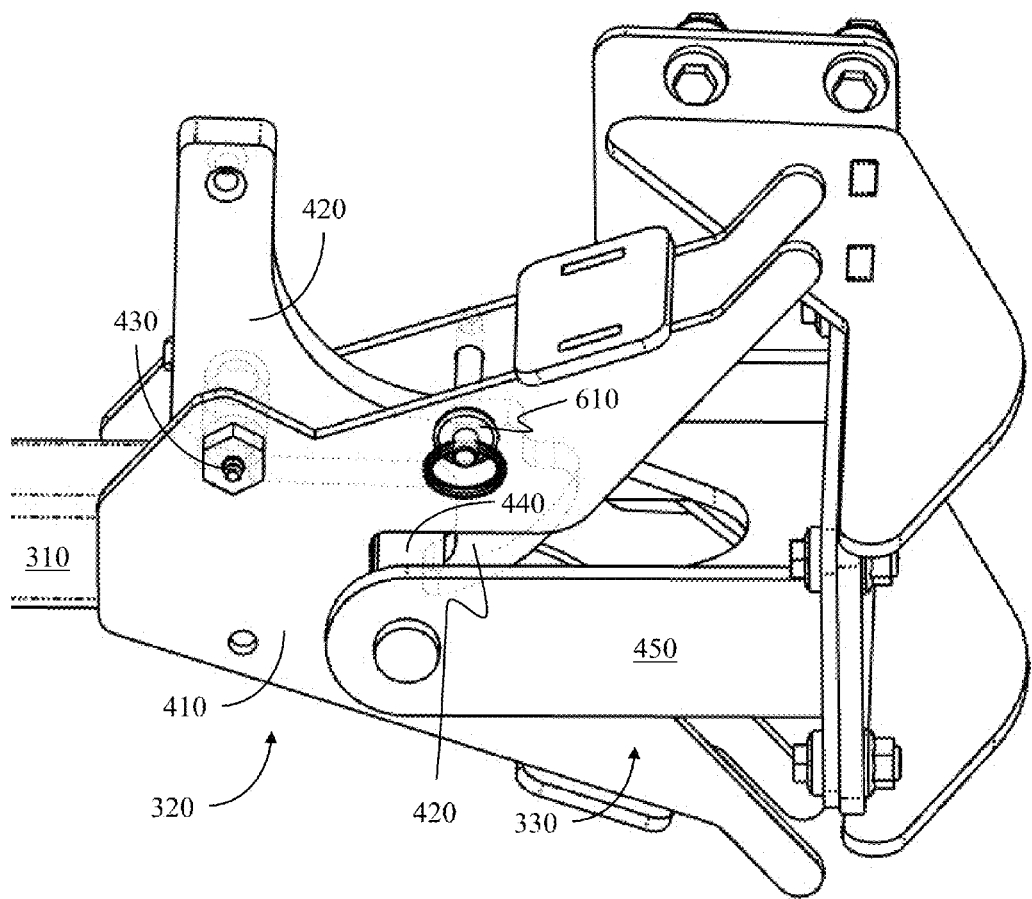
FIG. 7 is a perspective view, generally from the front of the implement, of the transport lock in its engaged configuration, and with the securing pin shown in FIG. 6.

FIG. 6 shows the transport locking mechanism assemblies 100a, 100b in the same latched configuration as that of FIG. 5, but from generally the top. A pin 610 may be inserted to hold the pivoting portion 420 more securely in its latched configuration than with the spring alone. The pin 610 is shown in FIG. 7 in a view, generally from the side.

Figure 8:
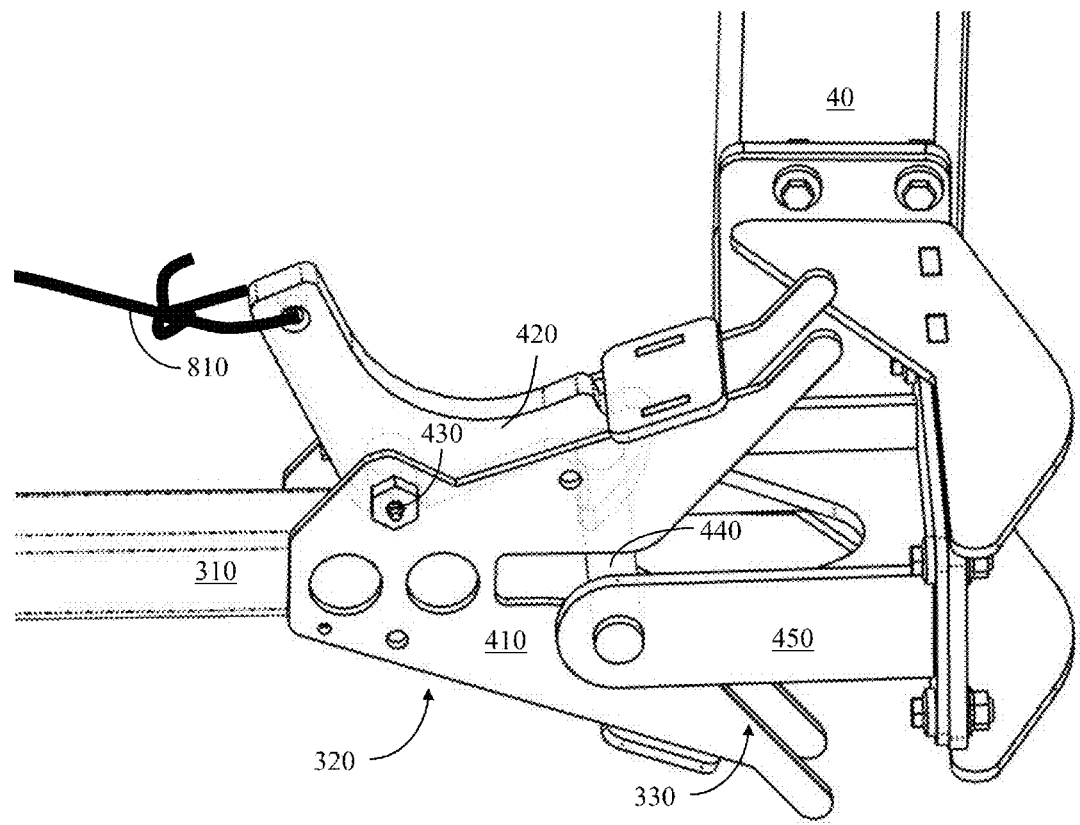
FIG. 8 is a perspective view, generally from the front of the implement, of the transport lock, just after disengaging by tension on a pull cord in a beginning of an unfolding operation.
Figure 9:
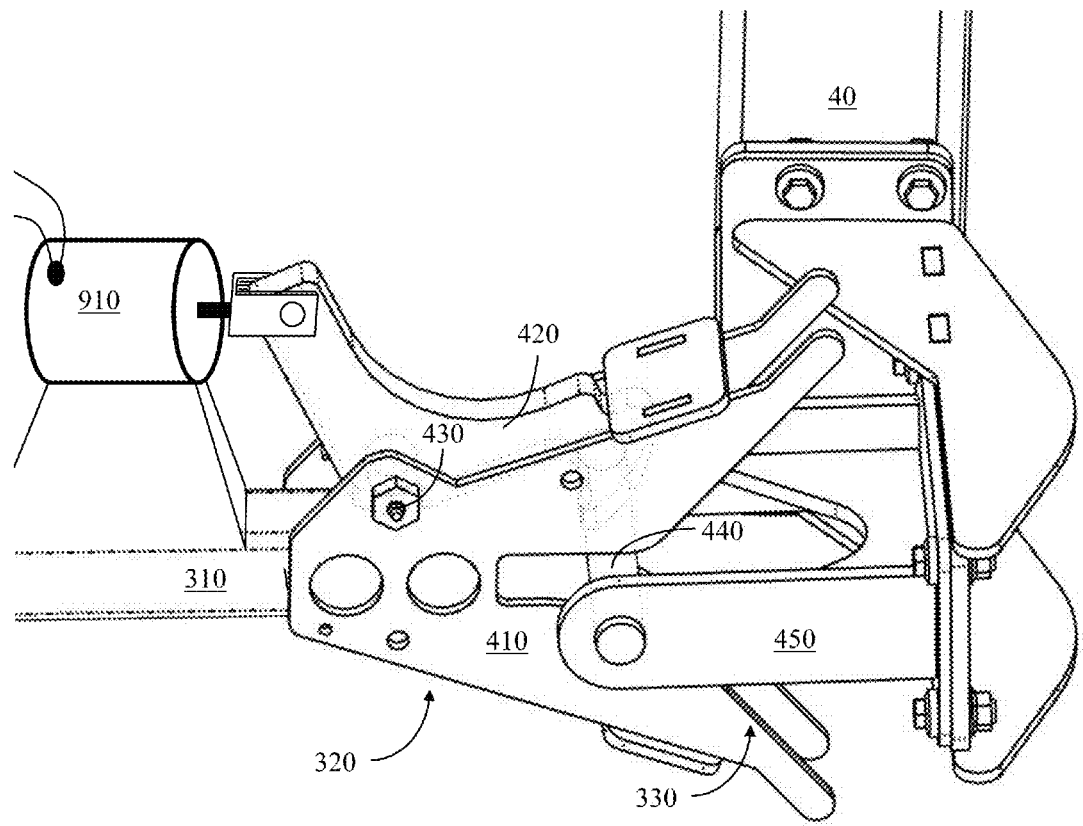
FIG. 9 is a perspective view, generally from the front of the implement, of the transport lock with an electric solenoid actuator for unlocking the transport lock before unfolding the implement.

The transport locking mechanism assemblies 100a, 100b are shown in an unlatched configuration in FIG. 8. The pivoting portion 420 has pivoted counterclockwise because of a force applied by the pull rope, cord, or cable 810 as pulled by the operator. Other methods of providing the force required to cause the pivoting portion 420 to pivot include a solenoid actuator 910, as shown in FIG. 9, stepper motor, hydraulics, and/or pneumatics. The present invention is not limited to a single mechanism for providing this force.

Figure 10:
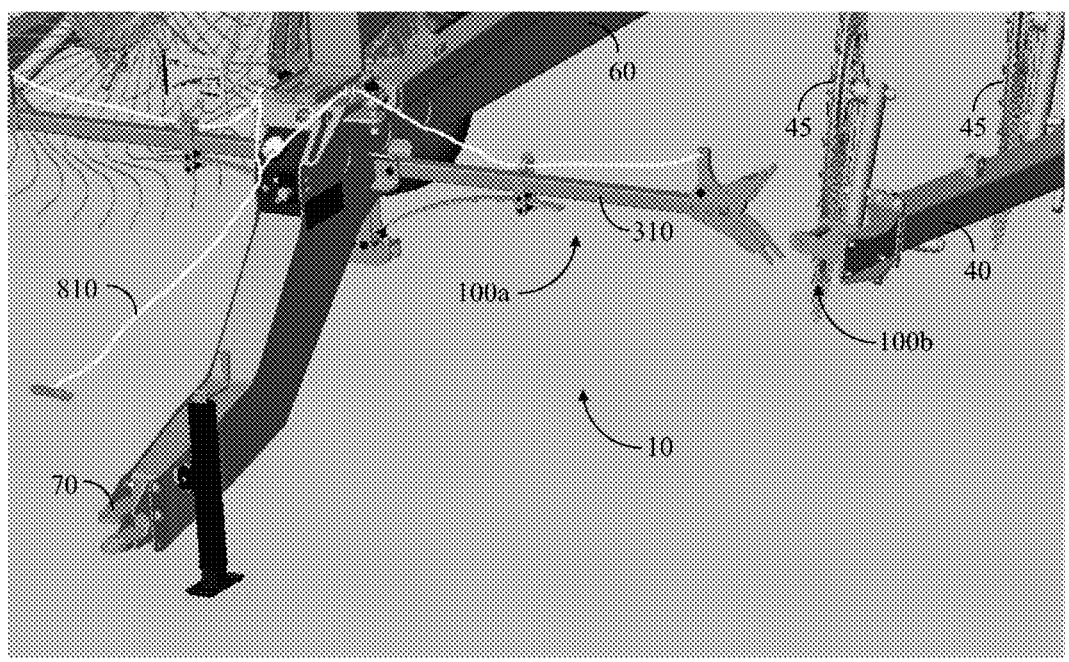
FIG. 10 is a perspective view, generally from the front of the implement, of the transport lock with a rope or cord for unlocking the transport lock before unfolding the implement.

A more complete view of an implement 10, with the transport locking mechanism assemblies 100a, 100b of the present invention, is shown in FIG. 10. The pull rope, cord, or cable 810 is also shown for unlatching the latch mechanism 320.

The above embodiments are the current preferred embodiments, but this invention is clearly not limited thereto. It is, therefore, apparent that many modifications and variations of the present invention are possible in light of the above teachings. It is, therefore, to be understood that within the scope of the appended claims, the invention may be practiced otherwise than as specifically described.

We claim:
1. A towable implement comprising:
(a) a cart comprising a plurality of wheels and a towing bar;
(b) at least one folding arm pivotally supported by the cart, each folding arm being configured to widen into an operative working position and narrow into an implement transport position, each folding arm having a free arm end, the free arm end having a folding arm latch location associated therewith;
(c) at least one respective implement unit operatively mounted to each folding arm;
(d) at least one extension arm, the at least one extension arm being independently and pivotably mounted on the cart, the at least one extension arm comprising at least one extension arm end;
(e) at least one latch mechanism carried by a corresponding said extension arm and thereby operatively, independently, and movably mounted relative to the cart, the at least one latch mechanism being selectably, releasably connected to a corresponding folding arm at a corresponding folding arm latch location of a given folding arm; and
(f) a given biasing suspension system for each said extension arm, the given biasing suspension system being attached to the cart and the corresponding said extension arm, the biasing suspension system being configured to the extension arm in a manner so as to favor alignment relative to a corresponding folding arm latch location.

2. The towable implement of claim 1, wherein the at least one latch mechanism comprises a latch element, operatively, pivotally attached to an extension bar end, the latch element being configured for operatively engaging a corresponding folding arm at a given folding arm latch location.

3. The towable implement of claim 2, wherein each folding arm latch location includes a crossbar configured for being operatively, releasably engaged by the at least one latch mechanism.

4. The towable implement of claim 3, further comprising a respective biasing mechanism operatively attached to the at least one latch mechanism, the respective biasing mechanism operates to bias the given latch mechanism toward the corresponding crossbar when the at least one latch mechanism and the corresponding crossbar are in a latch engagement position.

5. The towable implement of claim 2, additionally comprising a corresponding latch release associated with a respective latch mechanism, the corresponding latch release being configured for being selectively moving the corresponding latch element away from the corresponding folding arm latch location of the corresponding folding arm and out of engagement therewith.

6. The towable implement of claim 5, wherein the corresponding latch release comprises a pull cord, the pull cord being operatively attached to the respective latch element.

7. The towable implement of claim 5, wherein the corresponding latch release is actuated by at least one actuating device selected from a group consisting of a mechanical actuator, an electric actuator, a pneumatic actuator, an electromagnetic actuator, and a hydraulic actuator.

8. The towable implement of claim 1, wherein the towable implement unit comprises a hay rake.

9. The towable implement of claim 1, wherein a given said latch mechanism comprises a stationary V-shaped receiver member configured to facilitate receiving of a corresponding folding arm latch location therein.

10. A towable implement, comprising:
(a) a cart provided with a plurality of wheels and a towing bar;
(b) at least one folding arm pivotally supported by the cart, the at least one folding arm being configured for being widened into an operative working position and narrowed into an implement transport position, the at least one folding arm having a corresponding free arm end, the corresponding free arm end defining a corresponding latch location;
(c) at least one respective implement unit operatively mounted to the at least one folding arm;
(d) at least one extension arm, the at least one extension arm being independently and pivotably mounted on the cart, the at least one extension arm comprising at least one extension arm end;
(e) at least one folding arm latch mechanism carried by a corresponding said extension arm and thereby operatively attached to the cart, the at least one latch mechanism being selectively, releasably attached to the at least one folding arm latch mechanism and thereby holding the at least one folding arm in the implement transport position thereof; and
(f) a given biasing suspension system for each said extension arm, the given biasing suspension system being attached to the cart and the corresponding said extension arm, the biasing suspension system being configured to bias the extension arm in a manner so as to favor alignment relative to a corresponding folding arm latch location.

11. The towable implement of claim 10, wherein the at least one latch mechanism comprises a latch element pivotally attached to the cart, the latch element being configured for operatively engaging a corresponding latch location of a given free arm end of a corresponding folding arm.

12. The towable implement of claim 11, wherein a given latch location includes a crossbar configured for being operatively, releasably engaged by the at least one latch mechanism of the cart.

13. The towable implement of claim 12, further comprising a respective biasing mechanism operatively attached to the at least one latch mechanism and the corresponding crossbar, the respective biasing mechanism operates to bias the given latch mechanism toward the corresponding crossbar when the at least one latch mechanism and the corresponding crossbar are in a latch engagement position.

14. The towable implement of claim 11, additionally comprising a corresponding latch release associated with the at least one latch mechanism, the corresponding latch release being configured for selectively moving the corresponding latch element away from the corresponding folding arm latch location of one of the said corresponding folding arms and out of engagement therewith.

15. The towable implement of claim 14, wherein the corresponding latch release comprises a pull cord, the pull cord being operatively attached to the respective latch element.

16. The towable implement of claim 14, additionally comprising at least one actuating device for the latch release selected from a group consisting of a mechanical actuator, an electric actuator, a pneumatic actuator, an electromagnetic actuator, and a hydraulic actuator.

17. The towable implement of claim 10, wherein the towable implement unit comprises a hay rake.

18. A towable implement comprising:
(a) a cart comprising a plurality of wheels and a towing bar;
(b) a folding arm pivotally supported by the cart, the folding arm being configured to widen into an operative working position and narrow into an implement transport position, the folding arm having a free arm end, the free arm end having a folding arm latch portion associated therewith;
(c) at least one respective implement unit operatively mounted to the folding arm;
(d) an extension arm independently and pivotably mounted on the cart, the extension arm comprising a first extension arm end, the first extension arm end carrying an extension arm latch portion, one of the folding arm latch portion and the extension arm latch portion comprising a latch mechanism being selectably, releasably connected to a corresponding other of the folding arm latch portion and the extension arm latch portion; and
(e) a given biasing suspension system for each said extension arm, the given biasing suspension system being attached to the cart and the corresponding said extension arm, the biasing suspension system being configured to bias the extension arm in a manner so as to favor alignment relative to a corresponding folding arm latch location.

19. The towable implement of claim 18, wherein the latch mechanism comprises a stationary V-shaped receiver member configured to facilitate receiving of the other of the folding arm latch portion and the extension arm latch portion therein, the latch mechanism further comprising a pivoting latch element rotatably attached to the V-shaped receiver member.

20. The towable implement of claim 18, wherein the given biasing suspension system comprises a spring member.

* * * * *